US012587585B2

(12) United States Patent
Zhao et al.

(10) Patent No.: US 12,587,585 B2
(45) Date of Patent: Mar. 24, 2026

(54) SYSTEM, METHOD, AND STORAGE MEDIUM OF DISTRIBUTED EDGE COMPUTING FOR COOPERATIVE AUGMENTED REALITY WITH MOBILE SENSING CAPABILITY

(71) Applicant: Intelligent Fusion Technology, Inc., Germantown, MD (US)

(72) Inventors: Qi Zhao, Germantown, MD (US); Genshe Chen, Germantown, MD (US); Khanh Pham, Kirtland AFB, NM (US); Erik Blasch, Arlington, VA (US)

(73) Assignee: Intelligent Fusion Technology, Inc., Germantown, MD (US)

( * ) Notice: Subject to any disclaimer, the term of this patent is extended or adjusted under 35 U.S.C. 154(b) by 40 days.

(21) Appl. No.: 18/806,352

(22) Filed: Aug. 15, 2024

(65) Prior Publication Data

US 2024/0406269 A1     Dec. 5, 2024

Related U.S. Application Data

(63) Continuation-in-part of application No. 17/551,436, filed on Dec. 15, 2021, now Pat. No. 12,067,766.

(51) Int. Cl.
*H04L 67/131* (2022.01)
*H04L 67/10* (2022.01)

(52) U.S. Cl.
CPC ............ *H04L 67/131* (2022.05); *H04L 67/10* (2013.01)

(58) Field of Classification Search
None
See application file for complete search history.

(56) References Cited

U.S. PATENT DOCUMENTS

| | | | |
|---|---|---|---|
| 10,311,023 B1 | 6/2019 | Bowman et al. | |
| 10,650,590 B1 * | 5/2020 | Topiwala | H04L 67/61 |

(Continued)

OTHER PUBLICATIONS

Iqbal, Muhammad Hussain, and Tariq Rahim Soomro. "Big data analysis: Apache storm perspective." International journal of computer trends and technology 19.1 (2015): 9-14. (Year: 2015).

(Continued)

*Primary Examiner* — June Sison
(74) *Attorney, Agent, or Firm* — ANOVA LAW GROUP, PLLC

(57) ABSTRACT

The present disclosure provides a system of distributed edge computing for cooperative augmented reality with mobile sensing capability. The system includes a plurality of nodes configured to generate a plurality of data streams; and a plurality of distributed edge servers configured to process one or more tasks using the plurality of data streams. An Apache Storm distributed stream processing platform is installed and properly configured on each distributed edge server; the plurality of distributed edge servers includes one or more service modules installed on each distributed edge server and configured to process the one or more tasks; and the plurality of distributed edge servers includes a master distributed edge server and a plurality of slave distributed edge servers; and a scheduler is installed on the master distributed edge server and configured to distribute the one or more tasks to the plurality of distributed edge servers.

18 Claims, 5 Drawing Sheets

(56) References Cited

U.S. PATENT DOCUMENTS

| | | | |
|---|---|---|---|
| 11,947,826 B2 | 4/2024 | Olarig et al. | |
| 2019/0327340 A1 | 10/2019 | Alam et al. | |
| 2020/0151807 A1 | 5/2020 | Zhou et al. | |
| 2020/0279279 A1 | 9/2020 | Chaudhuri | |
| 2021/0334645 A1 | 10/2021 | Pardeshi et al. | |
| 2022/0197773 A1* | 6/2022 | Butler | H04N 21/2223 |
| 2023/0262243 A1 | 8/2023 | Ikonin et al. | |
| 2024/0078004 A1* | 3/2024 | Qian | G06F 3/0482 |
| 2025/0139913 A1* | 5/2025 | Doe | G06V 20/58 |

OTHER PUBLICATIONS

Gibbens, Mathias, et al. "Hadoop on named data networking: Experience and results." Proceedings of the ACM on Measurement and Analysis of Computing Systems 1.1 (2017): 1-2. (Year: 2017).
Kosaian, Jack, K. V. Rashmi, and Shivaram Venkataraman. "Parity models: erasure-coded resilience for prediction serving systems." Proceedings of the 27th ACM Symposium on Operating Systems Principles. 2019. (Year: 2019).

* cited by examiner

HoloLens

FIG. 4

SYSTEM, METHOD, AND STORAGE MEDIUM OF DISTRIBUTED EDGE COMPUTING FOR COOPERATIVE AUGMENTED REALITY WITH MOBILE SENSING CAPABILITY

CROSS-REFERENCE TO RELATED APPLICATION

This application is a continuation-in-part of application Ser. No. 17/551,436, filed on Dec. 15, 2021, the entire content of which is incorporated herein by reference.

GOVERNMENT RIGHTS

The present disclosure was made with Government support under Contract No. W51701-22-C-0058, awarded by the United States Army. The U.S. Government has certain rights in the present disclosure.

FIELD OF THE DISCLOSURE

The present disclosure generally relates to the field of augmented reality technology and, more particularly, relates to a system, a method, and a storage medium of distributed edge computing for cooperative augmented reality with mobile sensing capability.

BACKGROUND

Augmented Reality (AR) has emerged as a transformative technology, enriching real-world environments with real-time, immersive and context-sensitive digital overlays. Cooperative AR further advances such innovation by harnessing collective sensing capabilities of multiple devices to enhance situational awareness and enrich user experiences. However, comprehensive deployment of cooperative AR presents substantial challenges, including complexities in data processing, communication, and system scalability.

Distributed edge computing has surfaced as a potent solution to these challenges. By leveraging computational power and proximity of edge servers, this technology supports cooperative AR systems efficiently. Distributed edge computing facilitates the offloading of computationally intensive tasks from mobile devices, thereby enhancing processing speeds and reducing latency. Such capability is crucial for enabling real-time data processing, accurate object detection, and seamless integration of virtual content with physical environment, which is essential for immersive cooperative AR experiences.

Moreover, importance of mobile sensing is escalating across various domains, which is more critical as applications become increasingly distributed, dynamic, and large-scale. Mobile sensing faces significant challenges, such as accurately capturing and effectively coordinating information from an expanding global network of sensors. Distributed stream processing addresses these challenges by enabling the real-time handling and analysis of continuous data streams across multiple interconnected nodes. This approach is particularly relevant for applications that generate large volumes of data, including sensor networks, social media platforms, and Internet of Things (IoT) devices.

Edge computing complements distributed stream processing by bringing computational resources closer to where data is generated. Such shift not only significantly reduces latency and bandwidth usage but also enhances privacy and security by allowing sensitive data to be processed locally and minimizing exposure to long-distance transmission risks. In dynamic environments such as autonomous vehicles, smart cities, and industrial IoT, real-time analytics and decision-making are crucial, which makes edge computing a cornerstone for modern mobile sensing applications.

BRIEF SUMMARY OF THE DISCLOSURE

One aspect of the present disclosure provides a system of distributed edge computing for cooperative augmented reality (AR) with mobile sensing capability, applied to a service-centric distributed resource-aware architecture (SCDRA). The system includes a plurality of nodes, where the plurality of nodes includes a plurality of HoloLens nodes and a plurality of sensor nodes; and the plurality of nodes is configured to generate a plurality of data streams; and a plurality of distributed edge servers, configured to process one or more tasks using the plurality of data streams transmitted from the plurality of nodes. An Apache Storm distributed stream processing platform is installed on each of the plurality of distributed edge servers; and the plurality of nodes and the plurality of distributed edge servers are connected to each other through a wireless network; the plurality of distributed edge servers includes one or more service modules installed on each distributed edge server and configured to process the one or more tasks; and the plurality of distributed edge servers includes a master distributed edge server and a plurality of slave distributed edge servers; the master distributed edge server is configured to manage the plurality of slave distributed edge servers; and an Apache Storm scheduler is installed on the master distributed edge server and configured to distribute the one or more tasks to the plurality of distributed edge servers.

Another aspect of the present disclosure provides a method of distributed edge computing for cooperative augmented reality (AR) with mobile sensing capability, applied to a service-centric distributed resource-aware architecture (SCDRA). The method includes generating a plurality of data streams by a plurality of nodes, where the plurality of nodes includes a plurality of HoloLens nodes and a plurality of sensor nodes; and processing one or more tasks by a plurality of distributed edge servers using the plurality of data streams transmitted from the plurality of nodes. An Apache Storm distributed stream processing platform is installed on each of the plurality of distributed edge servers; and the plurality of nodes and the plurality of distributed edge servers are connected to each other through a wireless network; the plurality of distributed edge servers includes one or more service modules installed on each distributed edge server and configured to process the one or more tasks; and the plurality of distributed edge servers includes a master distributed edge server and a plurality of slave distributed edge servers; the master distributed edge server is configured to manage the plurality of slave distributed edge servers; and an Apache Storm scheduler is installed on the master distributed edge server and configured to distribute the one or more tasks to the plurality of distributed edge servers.

Another aspect of the present disclosure provides a non-transitory computer-readable storage medium, containing program instructions for, when being executed by a processor, performing a method of distributed edge computing for cooperative augmented reality (AR) with mobile sensing capability, applied to a service-centric distributed resource-aware architecture (SCDRA). The method includes generating a plurality of data streams by a plurality of nodes, where the plurality of nodes includes a plurality of HoloLens nodes and a plurality of sensor nodes; and processing one or more tasks by a plurality of distributed edge servers using the plurality of data streams transmitted from the plurality of nodes. An Apache Storm distributed stream processing platform is installed on each of the plurality of distributed edge servers; and the plurality of nodes and the plurality of distributed edge servers are connected to each other through a wireless network; the plurality of distributed edge servers includes one or more service modules installed on each distributed edge server and configured to process the one or more tasks; and the plurality of distributed edge servers includes a master distributed edge server and a plurality of slave distributed edge servers; the master distributed edge server is configured to manage the plurality of slave distributed edge servers; and an Apache Storm scheduler is installed on the master distributed edge server and configured to distribute the one or more tasks to the plurality of distributed edge servers.

Other aspects of the present disclosure may be understood by those skilled in the art in light of the description, the claims, and the drawings of the present disclosure.

BRIEF DESCRIPTION OF THE DRAWINGS

The accompanying drawings, which are incorporated into a part of the specification, illustrate embodiments of the present disclosure and together with the description to explain the principles of the present disclosure.

FIG. 4 depicts an exemplary screenshot of an Apache Storm UI webpage of a testbed according to various disclosed embodiments of the present disclosure.

DETAILED DESCRIPTION

References may be made in detail to exemplary embodiments of the disclosure, which may be illustrated in the accompanying drawings. Wherever possible, same reference numbers may be used throughout the accompanying drawings to refer to same or similar parts.

According to various embodiments of the present disclosure, a system of distributed edge computing for cooperative augmented reality (AR) with mobile sensing capability, applied to a service-centric distributed resource-aware architecture (SCDRA), is described in detail hereinafter.

Figure 1:
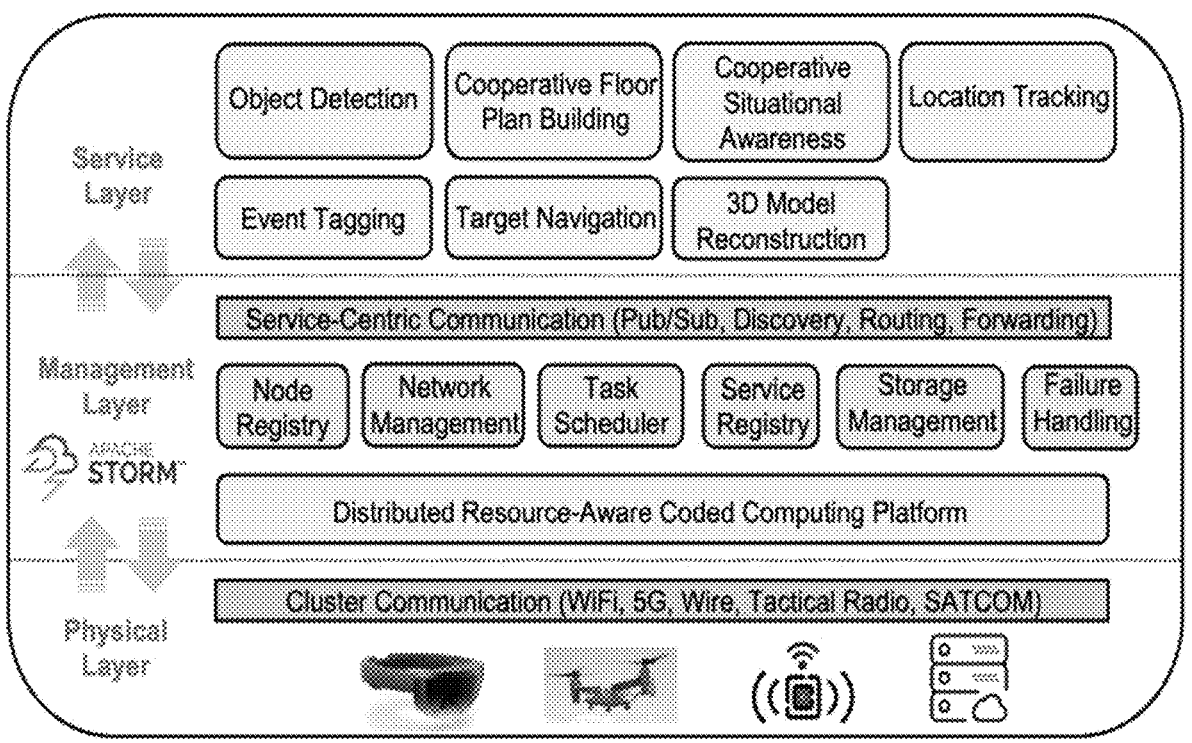
FIG. 1 depicts an exemplary service-centric distributed resource-aware (SCDRA) architecture according to various disclosed embodiments of the present disclosure.

FIG. 1 depicts an exemplary service-centric distributed resource-aware architecture according to various disclosed embodiments of the present disclosure. Referring to FIG. 1, the system of distributed edge computing includes a plurality of nodes, where the plurality of nodes includes a plurality of HoloLens nodes and a plurality of sensor nodes; and the plurality of nodes is configured to generate a plurality of data streams; and a plurality of distributed edge servers, configured to process one or more tasks using the plurality of data streams transmitted from the plurality of nodes. An Apache Storm distributed stream processing platform is installed on each of the plurality of distributed edge servers; and the plurality of nodes and the plurality of distributed edge servers are connected to each other through a wireless network; the plurality of distributed edge servers includes one or more service modules installed on each distributed edge server and configured to process the one or more tasks; and the plurality of distributed edge servers includes a master distributed edge server and a plurality of slave distributed edge servers; the master distributed edge server is configured to manage the plurality of slave distributed edge servers; and an Apache Storm scheduler is installed on the master distributed edge server and configured to distribute the one or more tasks to the plurality of distributed edge servers.

Figure 2:
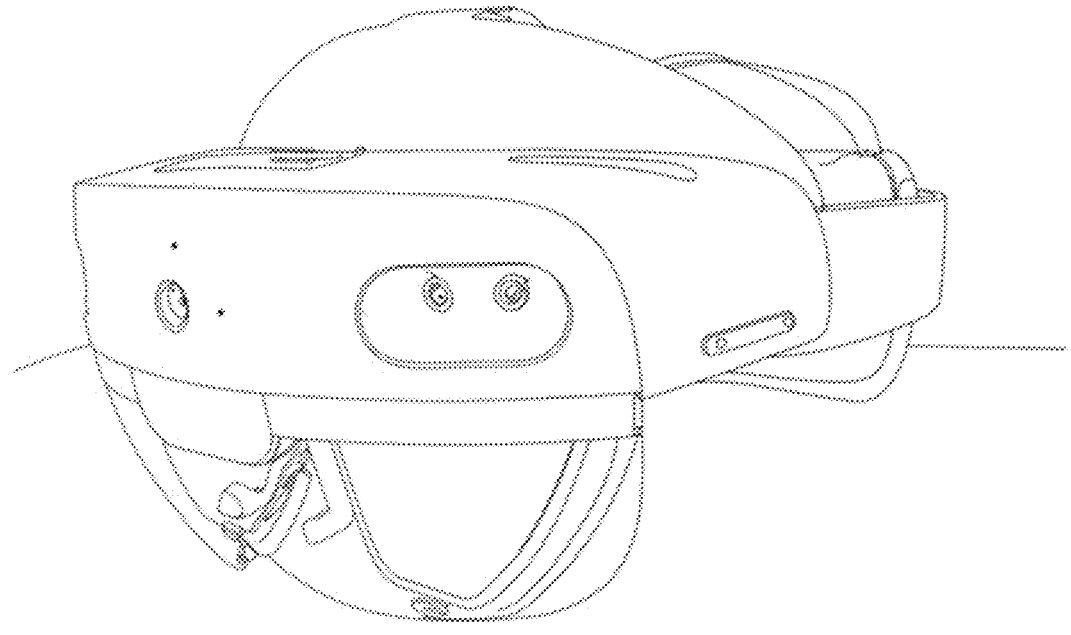
FIG. 2 depicts a schematic of an exemplary HoloLens according to various disclosed embodiments of the present disclosure.

FIG. 2 depicts a schematic of an exemplary HoloLens according to various disclosed embodiments of the present disclosure. HoloLens is a cutting-edge mixed reality (XR) headset developed by Microsoft that blends augmented reality (AR) and virtual reality (VR) technologies to provide an immersive, interactive experience. HoloLens allows users to see, interact with, and manipulate digital content overlaid onto the real world, using holographic displays. Equipped with advanced sensors, spatial mapping capabilities and gesture recognition, HoloLens enables hands-free operation and intuitive control, thereby making HoloLens a powerful tool for various applications.

Apache Storm is configured to handle intensive computational requirements of cooperative Augmented Reality (AR) applications. The platform is designed to capture, process, and analyze data streams from multiple HoloLens devices in real-time, facilitating seamless integration of virtual content into the physical environment. By distributing the workload across a cluster of nodes, including both Nimbus and Supervisor (worker) nodes and utilizing a ZooKeeper ensemble for coordination and fault tolerance, the Apache Storm setup may ensure low-latency processing and high availability.

In one embodiment, the one or more tasks include one or more of object detection, cooperative floor plan building, cooperative situational awareness, location tracking, event tagging, target navigation, and model reconstruction.

In one embodiment, the one or more tasks processed are shared among a plurality of users through the wireless network.

In one embodiment, the SCDRA includes a physical layer, a management layer, and a service layer.

In one embodiment, the physical layer includes the plurality of nodes and the plurality of distributed edge servers.

In one embodiment, the management layer includes a plurality of components including node registry, network management, task schedular, service registry, storage management, and failure handling.

The convergence of distributed edge computing and distributed stream processing forms a robust foundation for advancing mobile sensing technologies, particularly in the context of cooperative AR. In the present disclosure, these technologies collectively enhance the capabilities of cooperative AR, thereby paving the way for innovative applications that require dynamic, efficient, and secure data processing.

The present disclosure provides an innovative framework and architecture that facilitates advanced sensing, communication, and processing technologies to develop a robust distributed cooperative AR system. Such approach addresses the operational challenges of collecting extensive sensor data, executing efficient data fusion, ensuring precise object recognition, and integrating interactive 3D models directly into the user's view. At the heart of the system provided in the present disclosure is an architecture that combines the capabilities of HoloLens (a state-of-the-art AR headset) with edge servers interconnected via a wireless network. The HoloLens serves as a comprehensive sensing unit, gathering inputs from a variety of sensors, including cameras, depth sensors, and Inertial Measurement Units (IMUs). Such sensor data is transmitted to edge servers, where the data is processed through data fusion, analyzed, and used for object detection, all within the distributed edge computing framework. The system provided in the present disclosure not only elevates the AR experience by providing timely, context-aware insights but also demonstrates extensive capabilities of distributed edge computing in supporting cooperative AR applications. By delegating computationally demanding tasks to edge servers, the architecture significantly eases the load on mobile devices, thereby facilitating fluid and interactive AR experiences.

The present disclosure provides a framework that integrates advanced sensing, communication over wireless networks, and distributed edge computing for enabling real-time, scalable, and reliable cooperative AR experiences; addresses the challenges of implementing a distributed cooperative AR system by capturing data from multiple sensors on HoloLens, performing data fusion and accurate object recognition on edge servers, and seamlessly projecting reconstructed 3D models into the user's field of view; and further demonstrates the feasibility of the cooperative AR system, which is provided in the present disclosure, through an implementation that leverages the sensing capabilities of HoloLens, the computation power of edge servers integrated with Apache Storm and wireless communication, thereby showcasing the potential of distributed edge computing for immersive AR applications.

Evaluation of coded distributed computing models had been conducted to demonstrate capability to enhance distributed computing. Named data networking had been integrated into the Apache Storm-based distributed computing environment for improving object classification and recognition tasks. However, above work only remained at the simulation level with virtual machines for building the testbed; and the capability of supporting other applications or services was missing either. The present disclosure aims higher level framework design and implementation to demonstrate the framework capability using the Microsoft HoloLens enhanced AR sensing as an example application. Moreover, other work may be performed on edge computing in the medical field. Integration of 5G connectivity, edge computing, and Medical Extended Reality (MXR) may be performed in healthcare, exemplified by an MXR setup in an edge computing-enabled 5G network testbed, which may assess the effects of 5G network configurations on MXR by analyzing communication traffic and providing insights into MXR application behavior and infrastructure. Notably, above work may focused solely on client-server architecture, overlooking distributed computing setups.

Existing technology, such as the scalable distributed stream processing, may only focus on specific systems Aurora and Medusa, which have certain limitations. While Aurora assumes a single administrative domain for all nodes, Medusa attempts to address federated operation across administrative boundaries, but the economic contract model and mechanisms for load sharing and availability may be overly complex and impractical in real-world scenarios. Additionally, the landscape of distributed stream processing has evolved significantly, with the emergence of more modern systems and frameworks. Consequently, a meticulous comparison of various distributed stream processing frameworks may be conducted. The frameworks evaluated may include Apache Storm, Apache Spark Streaming, S4, Amazon Kinesis, and IBM Streams. The analysis may encompass various dimensions, including the type of framework, implementation language, supported languages for application development, level of abstraction, data sources, computation or transformation models, persistence mechanisms, execution reliability, fault tolerance, latency, and vendor affiliation. Apache Storm is selected as the distributed stream processing framework for following reasons. Firstly, Apache Storm offers robust support for real-time data processing with low latency and fault-tolerant architecture. Secondly, its scalability and flexibility make Apache Storm suitable for handling large volumes of data streams across distributed environments. Additionally, Apache Storm provides a wide range of programming languages for application development and integrates seamlessly with other big data tools and platforms. Therefore, the comprehensive features and proven performance make Apache Storm the ideal choice for the cooperative augmented reality system.

Apache Storm is an open-source, distributed real-time computation system designed for processing unbounded streams of data. Developed by the Apache Software Foundation, Storm is widely utilized for real-time analytics, online machine learning, and continuous computation applications. Primary strength of Apache Storm lies in its ability to reliably process vast amounts of data in real-time, making Apache Storm an ideal choice for building robust and scalable distributed systems.

At the core of Apache Storm is its streaming data model, which represents unbounded sequences of Tuples (key-value pairs). Such Tuples are processed by Topology, which includes Spouts (data sources) and Bolts (computational units). Spouts ingest data from external sources, such as message queues or databases, and emit Tuples into the Topology. Bolts, on the other hand, consume Tuples, perform computations or transformations, and optionally emit new Tuples downstream. Apache Storm's architecture is designed to be horizontally scalable, fault-tolerant, and highly available. Apache Storm employs a master-worker paradigm, where a central component called Nimbus manages the distribution of tasks across a cluster of worker nodes (Supervisors), thereby ensuring efficient resource utilization and fault tolerance through automatic reassignment of tasks upon node failures. One of the key features of Apache Storm is real-time processing capabilities, which may enable low-latency computation and response times. Such characteristic makes Apache Storm well-suited for applications that require immediate analysis and decision-making, such as real-time monitoring, anomaly detection, and event processing. In the present disclosure, the testbed is built upon the Apache Storm framework, leveraging distributed real-time computation capabilities to enable cooperative AR experiences. Apache Storm's ability to process unbounded streams of data in real-time makes it an ideal platform for handling the continuous flow of sensor data required for cooperative AR applications.

In evaluation testbed and demonstration, the capabilities of the Microsoft HoloLens (a pioneering AR headset) may be leveraged to showcase the potential of our cooperative AR system. The HoloLens played a crucial role as both a sensing device and a visualization platform, which may enable the user to capture real-world data, process the data through the Apache Storm-based distributed system, and render the augmented content back into the user's field of view. The HoloLens's advanced sensor suite, including multiple cameras, depth sensors and IMUs (inertial measurement units), may be instrumental in capturing rich environmental data. These sensors may collaborate to generate a detailed spatial map of the surroundings, thereby facilitating precise understanding of physical environment and accurate placement of virtual objects within physical environment.

One of the key advantages of the HoloLens is untethered, self-contained nature, which may allow for seamless mobility and freedom of movement during evaluation. Without the constraints of external computing devices or cables, the user may freely explore and interact with the augmented environment, thereby providing truly immersive and natural experience. The see-through display of the HoloLens may play a pivotal role in visualizing the augmented content generated by the cooperative AR system. Leveraging the device's spatial awareness capabilities may render 3D virtual contents that appear to coexist with real-world objects, thereby creating seamless integration of virtual and physical elements. Interaction with virtual objects may be facilitated by the HoloLens's intuitive interface, which may support natural gestures, gaze tracking and voice commands. The user may manipulate and explore the augmented content using hand gestures, thereby providing highly engaging and interactive experience.

By incorporating the Microsoft HoloLens into the evaluation testbed and demonstration, it may showcase the full potential of our cooperative AR system, from distributed sensing and real-time data processing to immersive visualization and natural interaction. The HoloLens's unique capabilities may enable the user to validate the feasibility and efficacy of the approach provided in the present disclosure, thereby paving the way for future advancements in cooperative AR applications across various domains.

According to various embodiments of the present disclosure, a framework architecture design is described in detail hereinafter.

The framework architecture may detail the integration of the Apache Storm and the interactions between corresponding components. As shown in FIG. 1, the Service-Centric Distributed Resource-Aware (SCDRA) architecture may aim to enhance edge computing platforms with distributed computing, content management, and advanced communication. In addition, the framework may focus on developing a platform that is not merely a data transit but an intelligent and proactive participant in data processing, management, and dissemination. The framework may integrate various components into a coherent structure that simplifies complex operations while retaining sophistication required for high-performance edge computing tasks. Moreover, the SCDRA architecture may include three primary layers, that is, a physical layer, a management layer, and a service layer, which may interact synergistically to support various edge computing applications.

The physical layer may include fundamental infrastructure of the SCDRA architecture; and may be an ensemble of edge devices, each outfitted with a suite of sensors, computation resources and communication interfaces. The devices may form the backbone of the architecture to collect data and execute tasks in concert with overlaying layers. The devices in this realm may include advanced AR headsets, such as the HoloLens, which may provide immersive experiences through detailed environmental scanning and interaction capabilities. Complementing to the devices may be drones and other mobile platforms that extend the sensing and computational reach of the framework. Communication technologies interconnecting the devices may range from conventional WiFi and wired networks to cutting-edge 5G infrastructures, thereby ensuring rapid and robust data exchange. The physical layer may be meticulously engineered to ensure seamless integration and interoperability, thereby providing a reliable and responsive fabric for the complex workflows demanded by contemporary edge computing applications.

Central to the SCDRA architecture may be the management layer which is entrusted with coherent orchestration of tasks and the management of computational resources across entire edge computing framework. In the architecture, the management layer may be anchored by Apache Storm which may bring resilience and elasticity to the framework. the management layer may include multiple critical components, such as Node Registry, Network Management, Task Scheduler, Service Registry, Storage Management and Failure Handling. To be concise, the management layer may orchestrate the communications between the service layer and the physical layer, thereby enabling Apache Storm to seamlessly perform distributed stream processing across the network. Such integration may ensure efficient data flow and real-time processing capabilities, which are essential for robust performance of the distributed architecture.

The service layer may be the domain where specialized application services reside, which may offer a spectrum of capabilities that turn the raw resources into meaningful user experiences. In addition, with different service module designs, the service layer may act as a mediator which allows each module to convert complex data needed into accessible formats and provide necessary interfaces for user interaction. In one embodiment, the object detection module, as illustrated in FIG. 1, may be capable of collecting video from the HoloLens or any video-capturing edge devices and performing object detection on the footage. Any edge device that subscribes to such module may gain access to processed video frames. Such functionality may not only enhance real-time data analysis but also enable devices across the edge network to benefit from advanced visual recognition capabilities, thereby improving overall system responsiveness and enabling more informed decision-making processes. The service layer's versatility may serve as cornerstone, which may ensure fluid integration of a set of services that cater to a wide array of functionalities. The services may range from location tracking (offer real-time positioning information) to 3D model reconstruction (convert spatial data into detailed three-dimensional representations). Each service may be meticulously crafted to align with specific preferences and objectives of the end-users. As a result, the service layer may become a dynamic ecosystem that not only responds to user demands but anticipates future needs, thereby fostering an environment of continuous innovation and service-centric development.

According to various embodiments of the present disclosure, evaluation testbed implementation is described in detail hereinafter.

Figure 3:
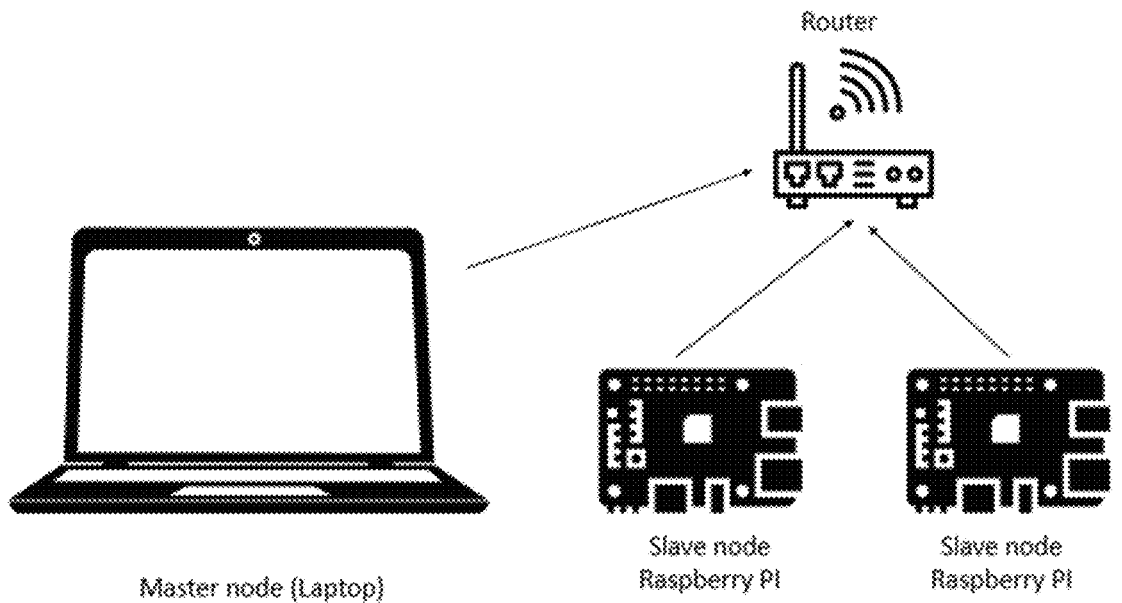
FIG. 3 depicts a schematic of an evaluation testbed hard implementation according to various disclosed embodiments of the present disclosure.

To conduct validation and demonstration, a testbed based on above-mentioned architecture is provided in the present disclosure, which may center on distributed computing environment utilizing Apache Storm framework. FIG. 3 depicts a schematic of an evaluation testbed hard implementation according to various disclosed embodiments of the present disclosure; and FIG. 4 depicts an exemplary screenshot of an Apache Storm UI webpage of the testbed according to various disclosed embodiments of the present disclosure. The screenshot of the Apache Storm cluster constructed for the testbed is illustrated in FIG. 4.

Referring to FIG. 3, the cluster may include three nodes, that is, a master node and two slave nodes. The master node, referred to as the Nimbus node, may be facilitated by a Dell laptop equipped with a 2.5 GHZ Intel i5 CPU and 8 GB RAM. The slave nodes, referred to as Supervisor nodes, may be implemented using two Raspberry Pi 4 model B devices. Each Raspberry Pi may feature a Broadcom BCM2711, Quad-core Cortex-A72 (ARM v8) 64-bit SoC CPU operating at 1.5 GHz, and 8 GB LPDDR4-3200 SDRAM. Additionally, above-mentioned devices may be equipped with an IEEE 802.11ac wireless interface supporting both 2.4 GHz and 5.0 GHz frequencies, and a Gigabit Ethernet port. All nodes may run a Linux operating system, which may have been appropriately configured. The nodes may be interconnected within a local area network (LAN) via a TP-LINK router, as depicted in FIG. 3. For optimal network connectivity, a wired connection may be utilized between each node and the router, which may avoid the potential variability of wireless connection.

Following the hardware setup and network configuration, the Apache Storm software may be installed and configured across the three nodes. The installation process may involve several critical steps to ensure robust deployment of Apache Storm suitable for testing needs. Initially, prerequisite packages required by Apache Storm may be installed on all nodes for preparing subsequent software deployments. Next, the Dell laptop may be focused, which may serve as the Nimbus node within the Apache Storm cluster. On the master node, ZooKeeper may be installed to manage coordination and provide essential services such as configuration management, synchronization, and naming registry to both the Nimbus and Supervisor nodes. For preliminary testing, a simplified setup using a single-node ZooKeeper (or cluster) may be opted. Such decision may be driven by the need to streamline initial testing phase while planning to expand the ZooKeeper cluster for enhanced fault tolerance and scalability in future iterations and final demonstration.

Following the setup of ZooKeeper, the Apache Storm package may be installed on all three nodes. Each node's configuration parameters may be meticulously adjusted to optimize performance and ensure seamless integration within the cluster. After the cluster is launched, an Apache Storm UI may be also activated, which may provide a graphical interface for monitoring and managing the cluster's operations. Successful setup and operational status of the cluster are depicted in FIG. 4, which illustrates the interaction between the nodes and overall health of the system. The screenshot indicates that Apache Storm version 2.4.0 may be utilized as software foundation. Currently, there are two Supervisor nodes operational within the cluster. Despite no active workers, executors or tasks currently running, the system's topology may remain active, and the uptime may continue to accrue. A distinctive feature of storm topology may be that the edge servers may remain active until manually deactivated or terminated by an administrator. The Storm UI may serve as a crucial tool for administrators to manage and interact with the system. Through such interface, the administrator may execute various critical operations. The first operation may be Activate. Such function may restore a previously deactivated topology to an active state, allowing the edge server to resume processing data. The second operation may be Deactivate. This option may set the topology's status to inactive, temporarily halting execution. However, the second operation may not affect the topology's recorded uptime or require redeployment. The third operation may be Rebalance. This powerful feature may enable dynamic adjustment of the number of worker processes and executors assigned to the topology. Remarkably, the dynamic adjustment may be accomplished without the need to restart the cluster or the topology itself, thereby ensuring uninterrupted operations. The last operation may be Kill. This command may terminate the topology entirely, removing the topology from Apache Storm and erasing topology from the Storm UI. To run such topology again, the administrator must redeploy the application from scratch. The administrator may initiate above-mentioned actions by navigating to the Topology Summary section of the Storm UI, selecting desired Topology, and accessing corresponding Topology summary page. This level of interactivity and control may enable efficient and flexible management of Storm Topology, which may be crucial for maintaining robust and reliable system operations.

Figure 5:
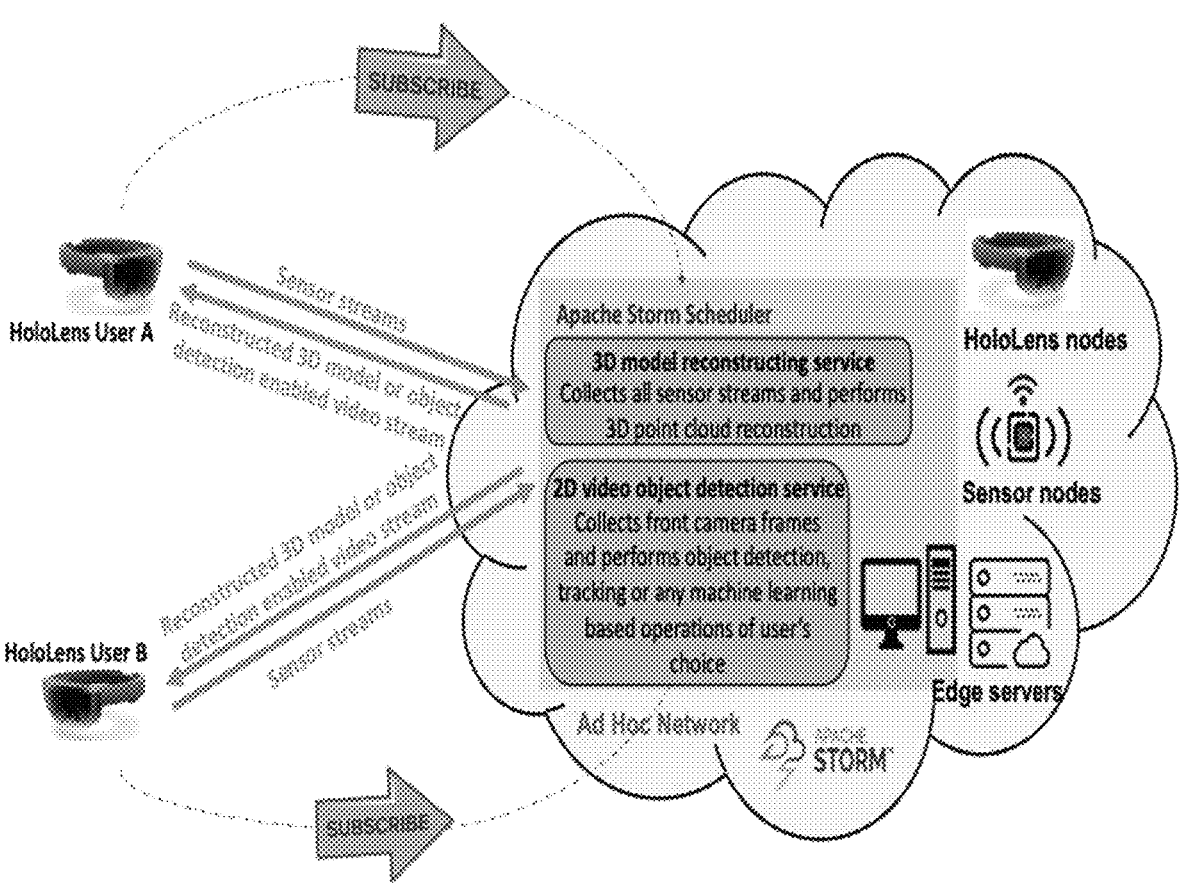
FIG. 5 depicts a schematic of a data flow and how the service (task) is performed on the service-centric distributed resource-aware (SCDRA) architecture according to various disclosed embodiments of the present disclosure.

According to various embodiments of the present disclosure, two service modules may be provided to harness the capabilities of the SCDRA architecture, which together facilitate cooperative augmented reality, thereby enhancing mobile sensing. These modules may serves as a proof of concept to demonstrate practical applications and effectiveness of the architecture. Above-mentioned modules may not only illustrate the potential for augmented collaboration but also set the stage for future innovations in mobile sensory augmentation. The design of above-mentioned two modules may harness the sensory capabilities of HoloLens devices, leveraging advanced sensor suite to capture rich environmental data crucial for AR applications. In module design for distributed sensing using HoloLens, Microsoft HoloLens 2 Research Mode API2321 may be used to capture sophisticated sensors' streams such as Recurrent Modulation (RM) Depth Long Throw sensors, RM IMUs, Spatial Input, Scene Understanding, and RGB front camera, thereby enabling precise depth perception, spatial mapping and high-definition video capture. Such distributed sensing capabilities of HoloLens may ensure the availability of real-time environmental context for enhanced AR experiences, thereby providing users with immersive and interactive overlays seamlessly integrated into physical surroundings. For the service modules, it is crucial to manage the data streams from HoloLens sensors, thereby facilitating real-time computation and dynamic response. The SCDRA architecture may excel in fault tolerance, scalability, and reliable processing of unbounded data streams, thereby making architecture an ideal system for high-demand AR applications that require immediate processing and minimal latency. The system may also use a network of Apache Storm Supervisors, each responsible for executing portions of stream processing tasks. The Supervisors may be organized in a cluster managed by a Nimbus server, which may distribute tasks, monitor performance, and reallocate resources as necessary to ensure efficient data handling. Such configuration may not only enhance the system's resilience against node failures but also improve load balancing across the computing nodes. FIG. 5 demonstrates the data flow as well as how the service (task) can be performed on the SCDRA system in the wireless network (i.e., Ad Hoc network). The stream processing in the system may be designed to handle various data streams transmitted from the HoloLens sensors, which can further be used by the service modules. The data streams may include depth information from RM Depth Long Throw sensors, motion data (spatial input) from IMUs, and visual inputs from the front cameras and light cameras. The Apache Storm Topology may be configured to ingest above-mentioned streams and orchestrate processing workflows required for AR rendering. In the architecture provided in the present disclosure, two service modules may have been developed for cooperative sensing.

According to various embodiments of the present disclosure, a 3D model reconstruction service is described in detail herein. The 3D model reconstructing application in the Apache Storm may provide a 3D cooperative perception mobile sensing service. In the 3D model reconstruction service, the Apache Storm Topology may receive data from the user of HoloLens through the HoloLens Research Mode API which provides raw sensor streams. Then, the service may process the streams to calculate positional data relative to the user's head position, which may capture the surrounding environment and calibrate the RGB front camera data with RM Depth Long Throw sensor information to generate a point cloud output which is crucial for accurate 3D model placement in the user's field of view. In such 3D reconstructing service module, the 3D models may be constructed using the Open3D toolkit and then ready to stream to another HoloLens user for display. Whichever HoloLens subscribes to the 3D model reconstruction service may select another user's 3D model, thereby enabling the user to interact with the environment augmented by accurate and real-time 3D content.

According to various embodiments of the present disclosure, a video object detection service is described in detail herein. The present disclosure provides the video object detection service module within the framework that utilizes the advanced capabilities of the HoloLens devices to create a video cooperative perception mobile sensing service. In video object detection service module, the Apache Storm Topology may capture video streams from the front cameras of the HoloLens, facilitated by the HoloLens Research Mode API, which offers access to raw sensor data. These streams may be immediately processed using the YOLOv8 25 algorithm, implemented via OpenCV to perform real-time object detection. Such detection may be pivotal for interactive AR application, which may enhance user engagement by identifying and annotating objects within the user's environment. Furthermore, the processed frames may be shared among users through the SCDRA system, thereby fostering a cooperative AR experience. As shown in FIG. 5, any user of the end devices that subscribes to such service module may have access to the processed video frames, which may enable multiple users to view each other's perspectives with object detection enabled, allow the users to see same object from different angles, thereby enriching the interactive experience and enhances the perception of the environment.

The present disclosure provides the framework (i.e., architecture) for enabling cooperative AR through the integration of advanced sensing, wireless communication and distributed edge computing. By leveraging the capabilities of the Microsoft HoloLens AR headset and edge servers connected over the wireless network, the system may address the significant challenges involved in implementing a scalable and reliable distributed cooperative AR solution. The implementation, built upon the Apache Storm platform, may demonstrate the feasibility of the approach and illustrate the potential of distributed edge computing for delivering immersive and context-aware AR experiences. By effectively merging distributed cooperative sensing with edge computing resources, the system may enable the seamless projection of reconstructed 3D models directly into the user's field of view, thereby offering a truly dynamic and interactive AR experience. The present disclosure showcases the viability of combining cutting-edge technologies, such as the HoloLens and edge computing, to create innovative solutions that push the boundaries of what is possible in the realm of AR. Additionally, the present disclosure may pave the way for future advancements and applications in various domains, where the fusion of virtual and physical environments can provide significant benefits. The integration of cooperative AR with distributed edge computing may continue to evolve, thereby enabling more sophisticated and robust systems capable of handling increasingly complex scenarios. The present disclosure may serve as a foundation for further exploration and development, ultimately driving the creation of more immersive, intuitive, and transformative AR experiences.

Various embodiments of the present disclosure provide a method of distributed edge computing for cooperative augmented reality (AR) with mobile sensing capability, applied to a service-centric distributed resource-aware architecture (SCDRA). The method includes generating a plurality of data streams by a plurality of nodes, where the plurality of nodes includes a plurality of HoloLens nodes and a plurality of sensor nodes; and processing one or more tasks by a plurality of distributed edge servers using the plurality of data streams transmitted from the plurality of nodes. An Apache Storm distributed stream processing platform is installed on each of the plurality of distributed edge servers; and the plurality of nodes and the plurality of distributed edge servers are connected to each other through a wireless network; the plurality of distributed edge servers includes one or more service modules installed on each distributed edge server and configured to process the one or more tasks; and the plurality of distributed edge servers includes a master distributed edge server and a plurality of slave distributed edge servers; the master distributed edge server is configured to manage the plurality of slave distributed edge servers; and an Apache Storm scheduler is installed on the master distributed edge server and configured to distribute the one or more tasks to the plurality of distributed edge servers.

Various embodiments of the present disclosure provide a non-transitory computer-readable storage medium, containing program instructions for, when being executed by a processor, performing a method of distributed edge computing for cooperative augmented reality (AR) with mobile sensing capability, applied to a service-centric distributed resource-aware architecture (SCDRA). The method includes generating a plurality of data streams by a plurality of nodes, where the plurality of nodes includes a plurality of HoloLens nodes and a plurality of sensor nodes; and processing one or more tasks by a plurality of distributed edge servers using the plurality of data streams transmitted from the plurality of nodes. An Apache Storm distributed stream processing platform is installed on each of the plurality of distributed edge servers; and the plurality of nodes and the plurality of distributed edge servers are connected to each other through a wireless network; the plurality of distributed edge servers includes one or more service modules installed on each distributed edge server and configured to process the one or more tasks; and the plurality of distributed edge servers includes a master distributed edge server and a plurality of slave distributed edge servers; the master distributed edge server is configured to manage the plurality of slave distributed edge servers; and an Apache Storm scheduler is installed on the master distributed edge server and configured to distribute the one or more tasks to the plurality of distributed edge servers.

Although some embodiments of the present disclosure have been described in detail through various embodiments, those skilled in the art should understand that above embodiments may be for illustration only and may not be intended to limit the scope of the present disclosure. Those skilled in the art should understood that modifications may be made to above embodiments without departing from the scope and spirit of the present disclosure. The scope of the present disclosure may be defined by the appended claims.

What is claimed is:

1. A system of distributed edge computing for cooperative augmented reality (AR) with mobile sensing capability, applied to a service-centric distributed resource-aware architecture (SCDRA), comprising:

a plurality of nodes, wherein the plurality of nodes includes a plurality of HoloLens nodes and a plurality of sensor nodes; and the plurality of nodes is configured to generate a plurality of data streams; and a plurality of distributed edge servers, configured to process one or more tasks using the plurality of data streams transmitted from the plurality of nodes, wherein:

an Apache Storm distributed stream processing platform is installed on each of the plurality of distributed edge servers; and the plurality of nodes and the plurality of distributed edge servers are connected to each other through a wireless network;

the plurality of distributed edge servers includes one or more service modules installed on each distributed edge server and configured to process the one or more tasks; and the plurality of distributed edge servers includes a master distributed edge server and a plurality of slave distributed edge servers; the master distributed edge server is configured to manage the plurality of slave distributed edge servers; and an Apache Storm scheduler is installed on the master distributed edge server and configured to distribute the one or more tasks to the plurality of distributed edge servers.

2. The system according to claim 1, wherein:

the one or more tasks include one or more of object detection, cooperative floor plan building, cooperative situational awareness, location tracking, event tagging, target navigation, and model reconstruction.

3. The system according to claim 1, wherein:

the one or more tasks processed are shared among a plurality of users through the wireless network.

4. The system according to claim 1, wherein:

the SCDRA includes a physical layer, a management layer, and a service layer.

5. The system according to claim 4, wherein:

the physical layer includes the plurality of nodes and the plurality of distributed edge servers.

6. The system according to claim 4, wherein:

the management layer includes a plurality of components including node registry, network management, task schedular, service registry, storage management, and failure handling.

7. A method of distributed edge computing for cooperative augmented reality (AR) with mobile sensing capability, applied to a service-centric distributed resource-aware architecture (SCDRA), comprising:

generating a plurality of data streams by a plurality of nodes, wherein the plurality of nodes includes a plurality of HoloLens nodes and a plurality of sensor nodes; and processing one or more tasks by a plurality of distributed edge servers using the plurality of data streams transmitted from the plurality of nodes, wherein:

an Apache Storm distributed stream processing platform is installed on each of the plurality of distributed edge servers; and the plurality of nodes and the plurality of distributed edge servers are connected to each other through a wireless network;

the plurality of distributed edge servers includes one or more service modules installed on each distributed edge server and configured to process the one or more tasks; and the plurality of distributed edge servers includes a master distributed edge server and a plurality of slave distributed edge servers; the master distributed edge server is configured to manage the plurality of slave distributed edge servers; and an Apache Storm scheduler is installed on the master distributed edge server and configured to distribute the one or more tasks to the plurality of distributed edge servers.

8. The method according to claim 7, wherein:

the one or more tasks include one or more of object detection, cooperative floor plan building, cooperative situational awareness, location tracking, event tagging, target navigation, and model reconstruction.

9. The method according to claim 7, wherein:

the one or more tasks processed are shared among a plurality of users through the wireless network.

10. The method according to claim 7, wherein:

the SCDRA includes a physical layer, a management layer, and a service layer.

11. The method according to claim 10, wherein:

the physical layer includes the plurality of nodes and the plurality of distributed edge servers.

12. The method according to claim 10, wherein:

the management layer includes a plurality of components including node registry, network management, task schedular, service registry, storage management, and failure handling.

13. A non-transitory computer-readable storage medium, containing program instructions for, when being executed by a processor, performing a method of distributed edge computing for cooperative augmented reality (AR) with mobile sensing capability, applied to a service-centric distributed resource-aware architecture (SCDRA), the method comprising:

generating a plurality of data streams by a plurality of nodes, wherein the plurality of nodes includes a plurality of HoloLens nodes and a plurality of sensor nodes; and processing one or more tasks by a plurality of distributed edge servers using the plurality of data streams transmitted from the plurality of nodes, wherein:

an Apache Storm distributed stream processing platform is installed on each of the plurality of distributed edge servers; and the plurality of nodes and the plurality of distributed edge servers are connected to each other through a wireless network;

the plurality of distributed edge servers includes one or more service modules installed on each distributed edge server and configured to process the one or more tasks; and the plurality of distributed edge servers includes a master distributed edge server and a plurality of slave distributed edge servers; the master distributed edge server is configured to manage the plurality of slave distributed edge servers; and an Apache Storm scheduler is installed on the master distributed edge server and configured to distribute the one or more tasks to the plurality of distributed edge servers.

14. The storage medium according to claim 13, wherein: the one or more tasks include one or more of object detection, cooperative floor plan building, cooperative situational awareness, location tracking, event tagging, target navigation, and model reconstruction.

15. The storage medium according to claim 13, wherein: the one or more tasks processed are shared among a plurality of users through the wireless network.

16. The storage medium according to claim 13, wherein: the SCDRA includes a physical layer, a management layer, and a service layer.

17. The storage medium according to claim 16, wherein: the physical layer includes the plurality of nodes and the plurality of distributed edge servers.

18. The storage medium according to claim 16, wherein: the management layer includes a plurality of components including node registry, network management, task schedular, service registry, storage management, and failure handling.

\* \* \* \* \*